(12) United States Patent
Chen

(10) Patent No.: US 6,829,972 B2  
(45) Date of Patent: Dec. 14, 2004

(54) SAW TABLE FOR FIXING PAINTING FRAMES TO BE CUT

(76) Inventor: Chung-Wu Chen, No. 64-2, Chiu Sheh Lane, Chiu Sheh, Pei Tun Area, Taichung (TW)

( * ) Notice: Subject to any disclaimer, the term of this patent is extended or adjusted under 35 U.S.C. 154(b) by 0 days.

(21) Appl. No.: 10/410,305

(22) Filed: Apr. 10, 2003

(65) Prior Publication Data

US 2004/0200331 A1 Oct. 14, 2004

(51) Int. Cl.7 .............................. B26D 7/02; B26D 3/02; B27G 5/02
(52) U.S. Cl. .................. 83/761; 83/581; 83/698.21; 83/823; 83/454; 83/464; 83/466; 269/41; 269/87.1
(58) Field of Search .................... 83/581, 823, 827, 83/761, 762, 454, 460.1, 828, 464, 743, 698.21, 755, 765, 766, 767; 269/295, 41, 87, 87.1

(56) References Cited

U.S. PATENT DOCUMENTS

| | | | | |
|---|---|---|---|---|
| 451,089 A | * | 4/1891 | Wagoner | 83/765 |
| 505,024 A | * | 9/1893 | Brandon | 83/755 |
| 600,118 A | * | 3/1898 | Bruno | 83/767 |
| 613,189 A | * | 10/1898 | Cooper | 83/767 |
| 960,159 A | * | 5/1910 | Dipworth | 83/762 |
| 2,322,433 A | * | 6/1943 | Gammache | 83/762 |
| 2,323,319 A | * | 7/1943 | Finnell | 83/761 |
| 3,028,888 A | * | 4/1962 | Chapin et al. | 83/761 |
| 3,273,612 A | * | 9/1966 | Keddie | 83/761 |
| 3,308,858 A | * | 3/1967 | De Hart | 83/761 |
| 3,893,362 A | * | 7/1975 | Schneider et al. | 83/763 |
| 4,377,959 A | * | 3/1983 | DeCarolis | 83/762 |
| 4,437,375 A | * | 3/1984 | Elmore et al. | 83/762 |

FOREIGN PATENT DOCUMENTS

| | | | | | |
|---|---|---|---|---|---|
| GB | 2185436 A | * | 7/1987 | | B27G/5/00 |
| GB | 2208624 A | * | 4/1989 | | B27G/5/02 |

* cited by examiner

Primary Examiner—Boyer D. Ashley  
(74) Attorney, Agent, or Firm—Browdy and Neimark, P.L.L.C.

(57) ABSTRACT

A saw table for fixing frame pieces of frames of paintings, pictures or photos, includes a base table having two arms crossed and substantially perpendicular to each other and a gap at where the arms are crossed, wherein the arms are respectively provided with a fastening device to secure a frame piece to be cut, and a guiding assembly having a guiding shaft provided on one of the arms at where the arms are crossed and is adjacent to the gap and an attracting device movably mounted on the guiding shaft. The attracting device has a magnet thereon for attracting a saw blade attached on the attracting device with a blade cutting portion of the saw blade received in the gap and the guiding shaft and the attracting device are respectively provided with a positioning device to fixedly secure the attracting device on the guiding shaft.

4 Claims, 5 Drawing Sheets

SAW TABLE FOR FIXING PAINTING FRAMES TO BE CUT

BACKGROUND OF THE INVENTION

1. Field of the Invention

The present invention relates generally to a tool of carpenter, and more particularly to a saw table for fixing frames of paintings, pictures or photos to be cut by the saw blade.

2. Description of the Related Art

A frame of a painting has four frame pieces cut a 45 degrees angle at opposite ends respectively and coupled with each other to form a rectangular hollow frame. A conventional saw table for fixing the frame pieces to be cut had a complex device for adjustment the angle of the frame pieces and a device to fix them. The conventional saw table usually had a huge size that was not good for fixing the frame pieces to be cut with fixed angles.

Another conventional saw table had an angle-adjusting device for enabling the saw blade to cut the opposite ends of the frame pieces into same angles. Such saw table had problem to stable the saw blade when cutting the frame pieces at predetermined height. The frame pieces fixed by the conventional saw table and cut by the saw blade were hard to connected with each other in a tight condition, they always had clearance in junctions of the frame pieces

SUMMARY OF THE INVENTION

The primary objective of the present invention is to provide a saw table for fixing frame pieces of painting frames to be cut, enabling the frame pieces fixed in a stable condition for cutting.

According to the objective of the present invention, a saw table comprises a base table having two arms substantially perpendicular to each other with a gap between the arms, wherein there is a predetermined angle between each arm and the gap and the arms are respectively provided with a fastening device to secure a frame piece to be cut, and a guiding assembly having a guiding shaft provided on one of the arms adjacent to the gap and an attracting device movably mounted on the guiding shaft. The attracting device has at least a magnet thereon for attracting a saw blade attached on the attracting device with a blade cutting portion of the saw blade received in the gap and the guiding shaft and the attracting device are respectively provided with a positioning device to fixedly secure the attracting device on the guiding shaft.

DETAILED DESCRIPTION OF THE INVENTION

Please refer to FIGS. from FIG. 1 to FIG. 4, a saw table for fixing frames of paintings, pictures or photos to be cut comprises the flowing elements.

Figure 1:
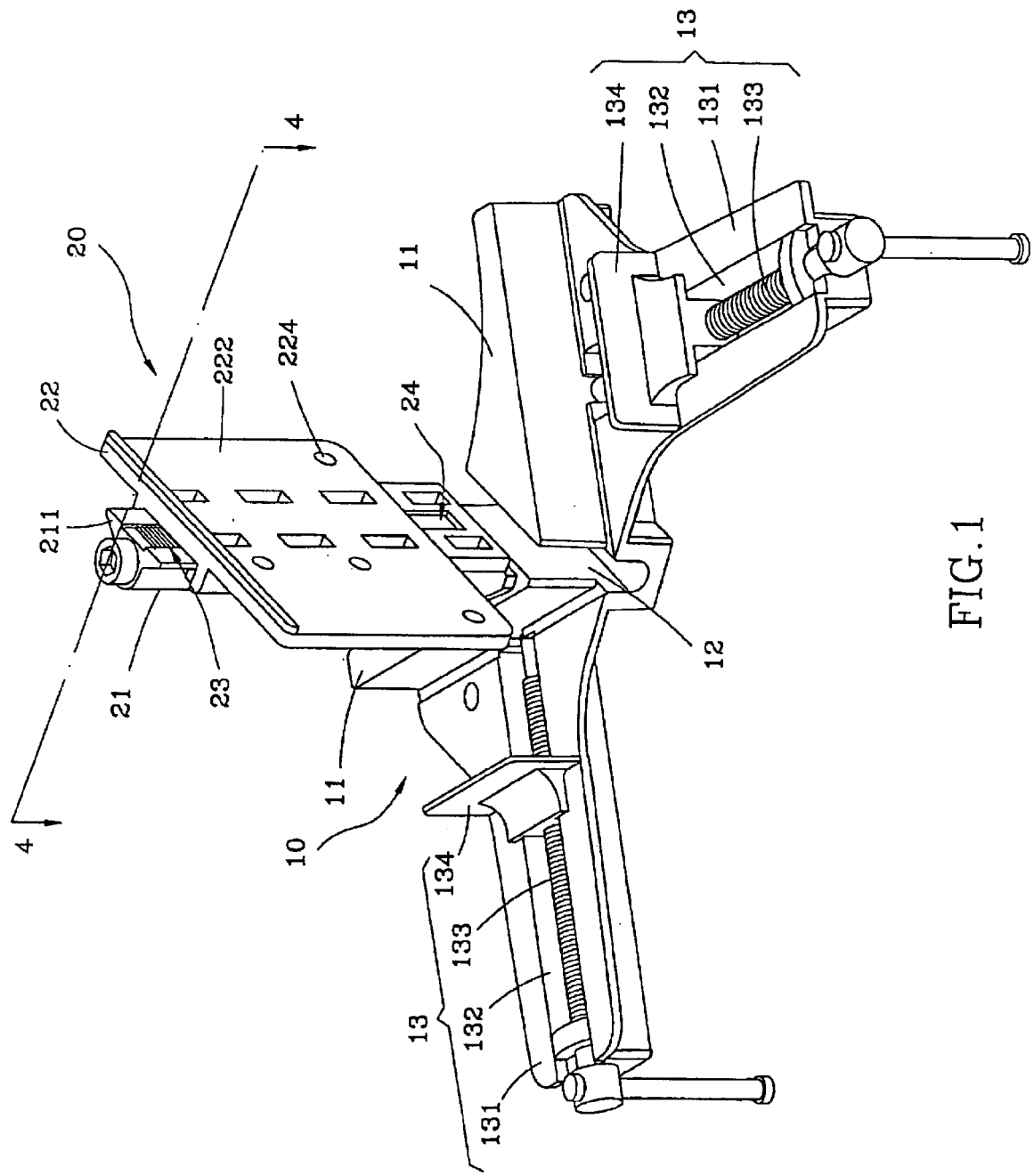
FIG. 1 is a perspective view of a preferred embodiment of the present invention.

As shown in FIG. 1, a base table 10 has two arms 11 perpendicular to each other and a gap 12 between the arms 11. The angle between the arms 11 and the gap 12 is 45 degrees and the angle can be designed in a range of 30 degrees to 60 degrees to meet the exact angles of frame pieces being cut, if desired. The arms 11 are respectively provided with a fastening device 13. In the present embodiment, each fastening device 13 has a pair of arms side 131 projecting from a bottom of the corresponding arm 11 and the angle between each side arm 131 and the arm 11 is 90 degrees to put a frame piece thereon. Each pair of arms 131 has a guiding slot 132 at a middle of the arms which is perpendicular to the corresponding arm 11 and a guiding bar 133 disposed in the guiding slot 132. The guiding bar 133 has a block 134 to be moved by the guiding bar 133 such that the block 134 can move in the guiding slot 132 toward or away from the corresponding arm 11.

Figure 2:
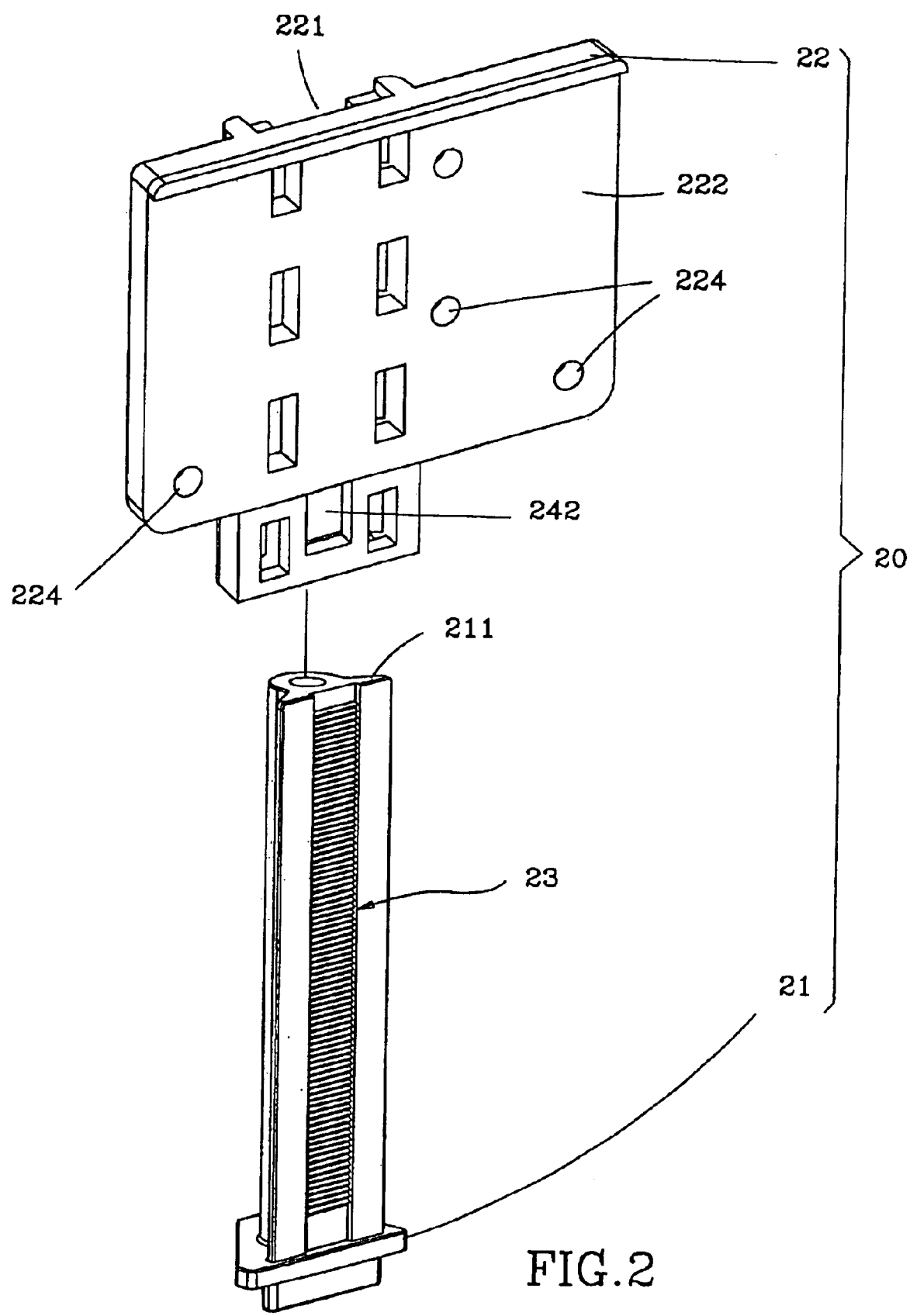
FIG. 2 is a front perspective view of the guiding bar and the attracting device of the preferred embodiment of the present invention.
Figure 3:
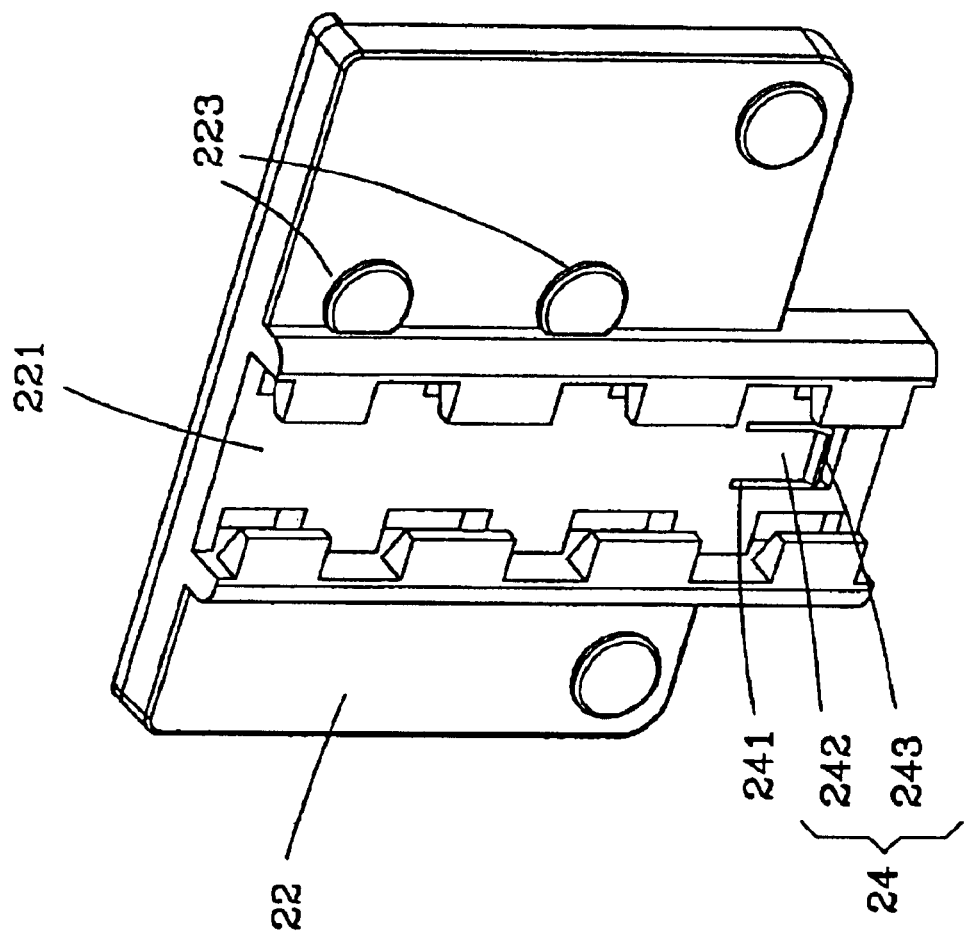
FIG. 3 is a rear perspective view of the guiding bar and the attracting device of the preferred embodiment of the present invention.

A guiding assembly 20, as shown in FIGS from FIG. 1 to FIG. 3, has a guiding shaft 21 provided at on one of the arms 11. The guiding shaft 21 has a core portion 211 adjacent to the gap 12 and perpendicular to the arms 11. The guiding assembly 20 further has an attracting device 22 having a clamping slot 221 engaged with the core portion 211 and to be moved along the guiding shaft 21. The attracting device 22 further has a plate 222 above the gap 12 on which at least a magnet 223 is mounted and at least a hole 224 is provided corresponding to the magnet 223. A saw blade can be attracted by the magnet 223 and attached on the plate 222 perpendicular to the arms 11 and a cutting portion of the saw blade is received in the gap 12.

Figure 4:
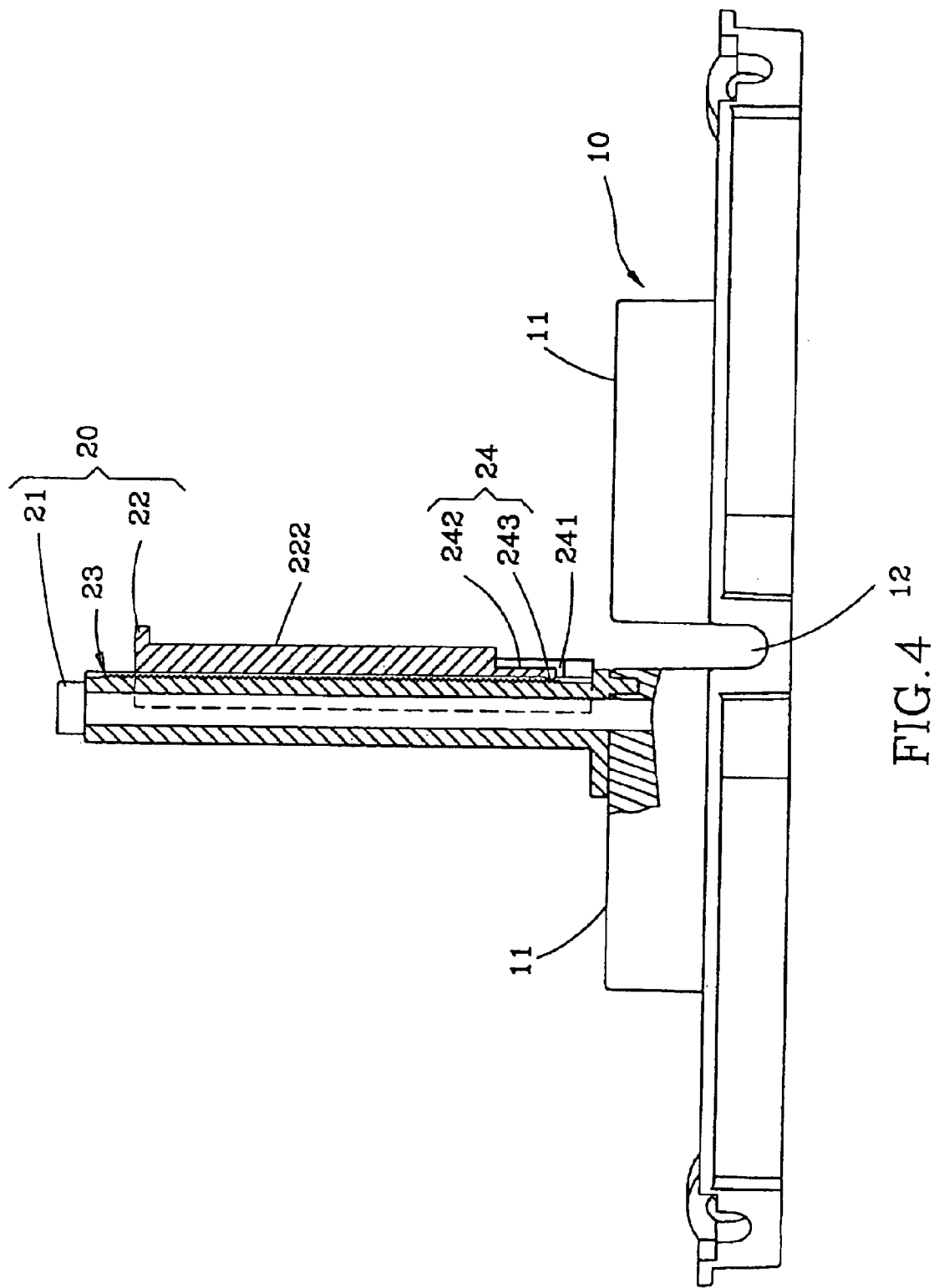
FIG. 4 is a sectional view taken along line 4—4 in FIG. 1.

As shown in the FIGS. from FIG. 2 to FIG. 4, the guiding shaft 21 and the attracting device 22 are respectively provided with a positioning device 23 and 24. The positioning devices 23 and 24 are provided to make the attracting device 22 moveable on the guiding shaft 21 to a predetermined position. In the present embodiment, the positioning device 23 on the guiding shaft 21 is a rack on the core portion 211 and the positioning device 24 on the attracting device 24 has a U-shaped recess 241 and an elastic piece 242 in the recess 241. The elastic piece 242 has a tooth 243 to be engaged with the rack 23 on the guiding shaft 21 to fix the attracting device 24 on the guiding shaft 21 at a specific position. There are many alternate mechanisms for the positioning devices 23 and 24, such as a ball engaged with a recess, they should be in the scope of the present invention.

Figure 5:
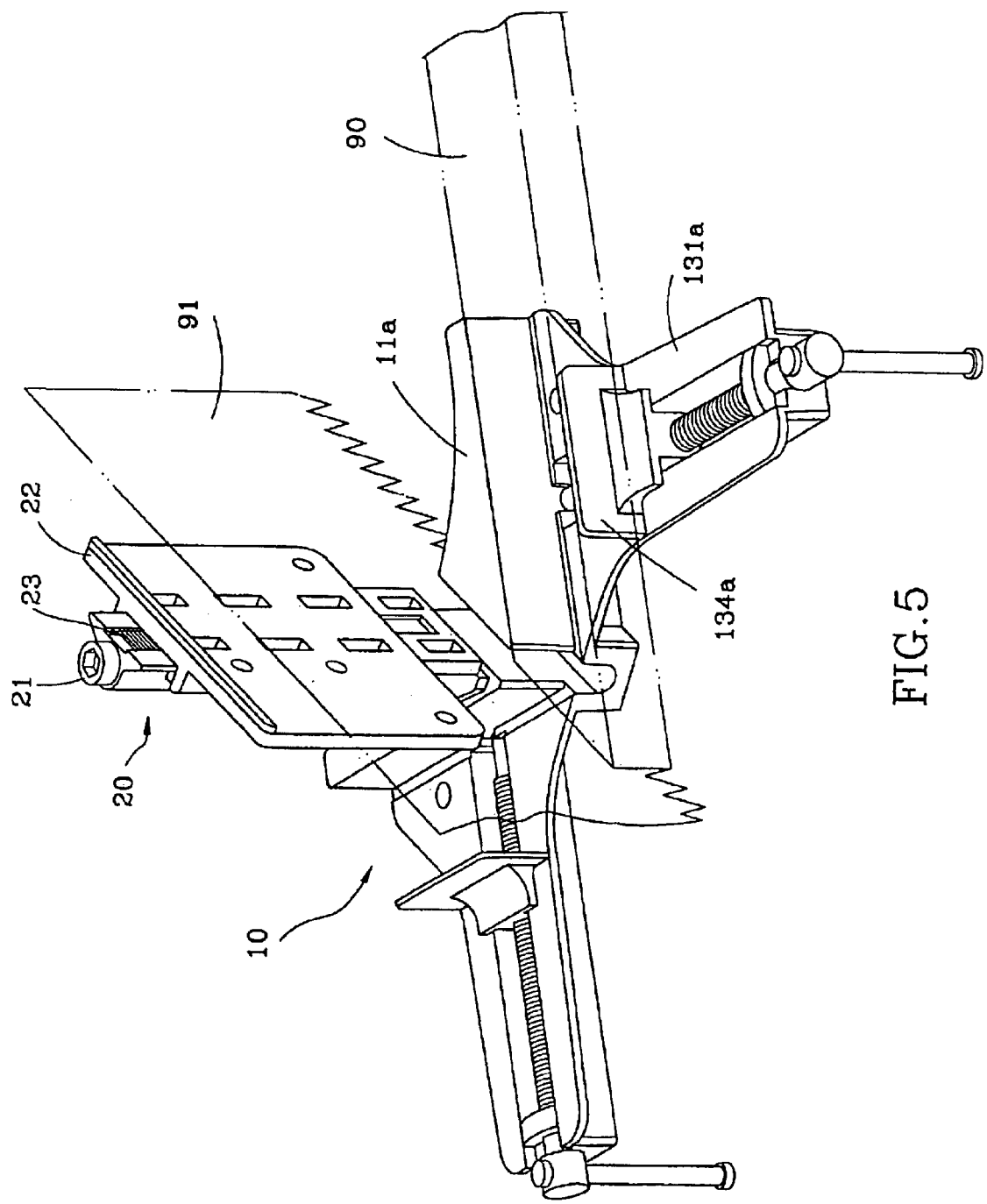
FIG. 5 is a schematic view, showing how to cut a frame piece.

As shown in FIG. 5, a frame piece 90 is put on the side arm 131a and the block 134a is moved to press it so that the frame piece 90 will be fixed thereon between the block 134a and the arm 11a. A saw blade 91 is attracted by the magnet 223 and attached on the plate 222, it will be moved along the plate 222 stably without swing to cut the frame piece 90 off. The positioning devices 23 and 24 make the attracting device 24 secured on the guiding shaft 21 fixedly so that the plate 222 will not swing too when the saw blade 91 is cutting the frame piece 90. The cut surfaces of the frame piece 90 will be smooth and flat to make the frame pieces 90 can be coupled with each other in a tight condition.

What is claimed is:

1. A saw table for fixing frame pieces for paintings, pictures or photos, comprising:

a base table having two arms substantially perpendicular to each other, a gap between the arms, wherein there is a predetermined angle between each of the arms and the gap and the arms are respectively provided with a fastening device to secure a frame piece to be cut, and a guiding assembly having a guiding shaft provided on one of the arms adjacent to the gap and an attracting device movably mounted on the guiding shaft, wherein the attracting device has at least a magnet thereon for attracting a saw blade engaged on the attracting device with a blade cutting portion of the saw blade received in the gap and the guiding shaft and the attracting device are respectively provided with a positioning device to fixedly secure the attracting device at a selected position on the guiding shaft.

2. The saw table as defined in claim 1, wherein the positioning device on the guiding shaft is a rack and the positioning device on the attracting device has a U-shaped recess in which provides an elastic piece with a tooth thereon, wherein the tooth is engaged with the rack to fixedly secure the attracting device on the guiding shaft.

3. The saw table as defined in claim 1, wherein the guiding shaft has a core portion and the attracting device has a clamping slot for engagement with the core portion to permit movement of the attracting device along the guiding shaft.

4. The saw table as defined in claim 3, wherein the positioning device on the guiding shaft is a rack provided at the core portion and the positioning device on the attracting device has a U-shaped recess in which an elastic piece is provided with a tooth thereon, wherein the tooth is engaged with the rack to fixedly secure the attracting device on the guiding shaft at the selected position.

* * * * *